(No Model.) 3 Sheets—Sheet 1.

M. SCHLATTER.
FEED AND BAND CUTTING ATTACHMENT FOR THRASHING MACHINES.

No. 521,674. Patented June 19, 1894.

WITNESSES:
J. A. Bergstrom
C. Sedgwick

INVENTOR
M. Schlatter
BY Munn & Co.
ATTORNEYS.

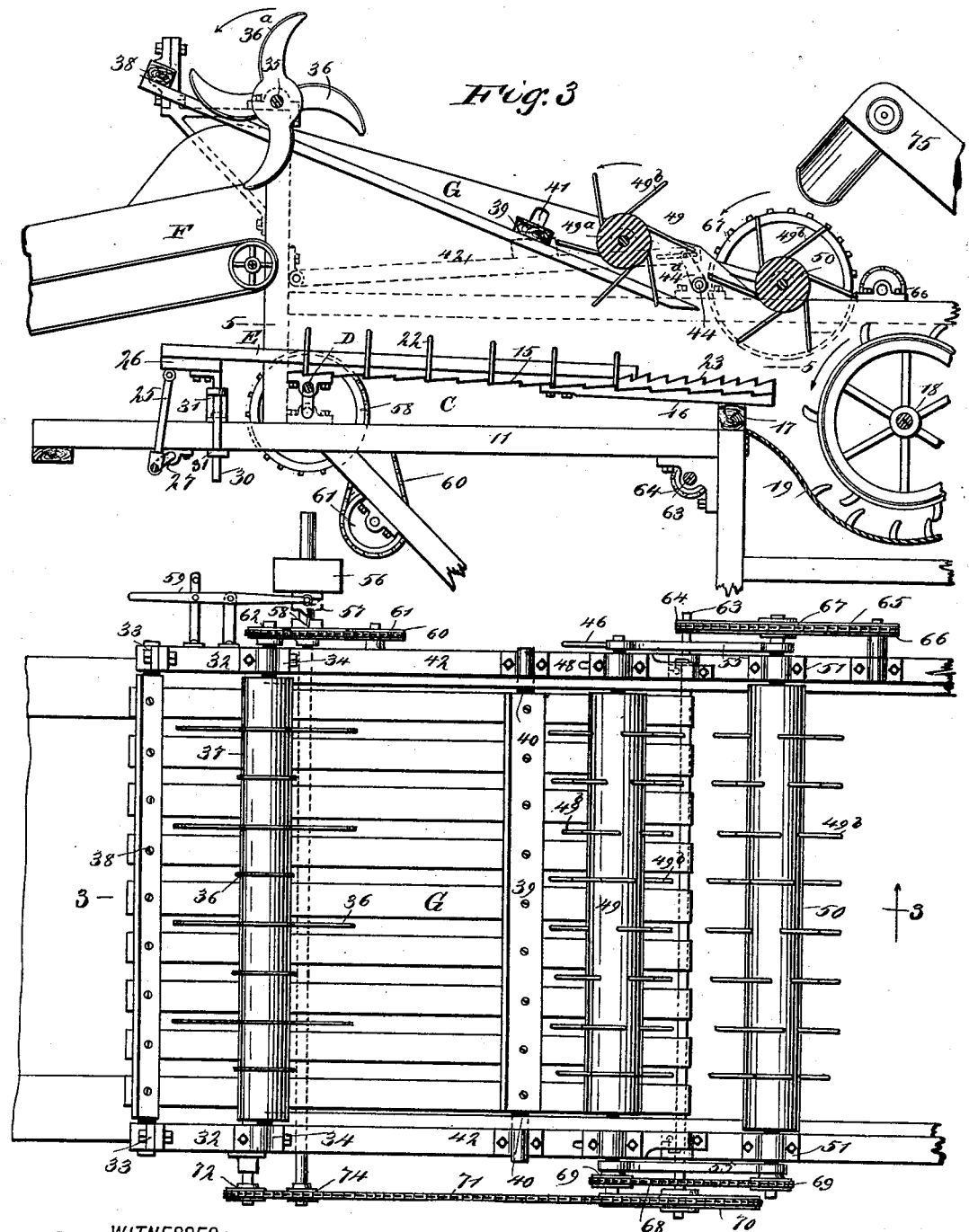

(No Model.) 3 Sheets—Sheet 3.
M. SCHLATTER.
FEED AND BAND CUTTING ATTACHMENT FOR THRASHING MACHINES.
No. 521,674. Patented June 19, 1894.
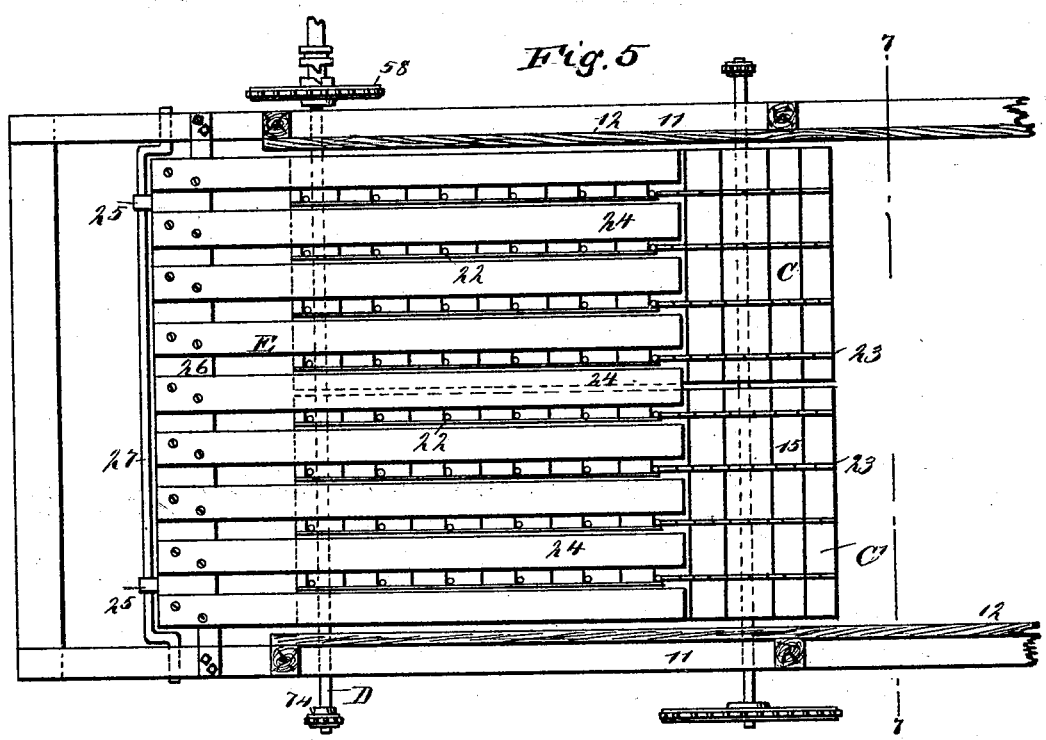
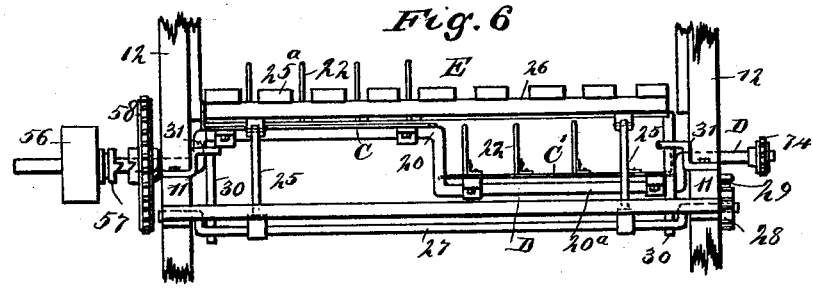
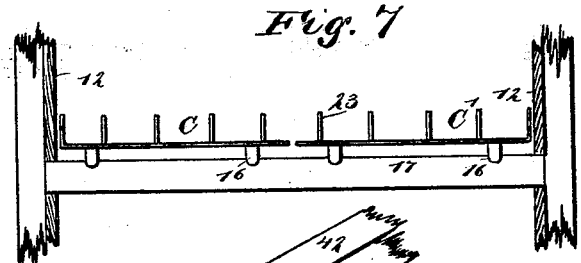
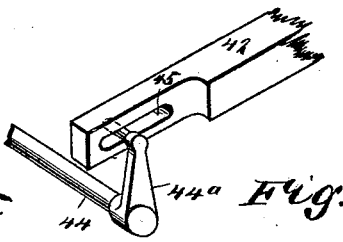
WITNESSES:
J. A. Bergstrom
C. Sedgwick
INVENTOR
M. Schlatter
BY Munn & Co
ATTORNEYS.
THE NATIONAL LITHOGRAPHING COMPANY,
WASHINGTON, D. C.

UNITED STATES PATENT OFFICE.

MOSES SCHLATTER, OF BURRTON, KANSAS.

FEED AND BAND-CUTTING ATTACHMENT FOR THRASHING-MACHINES.

SPECIFICATION forming part of Letters Patent No. 521,674, dated June 19, 1894.

Application filed July 20, 1893. Serial No. 481,026. (No model.)

*To all whom it may concern:*

Be it known that I, MOSES SCHLATTER, of Burrton, in the county of Harvey and State of Kansas, have invented a new and Improved Feed and Band-Cutting Attachment for Thrashing-Machines, of which the following is a full, clear, and exact description.

My invention relates to a band cutting and feeding attachment for thrashing machines, and it has for its object to construct the cutter and feeder in such manner that it will be impossible for the cylinder of the thrasher to draw to it more material than it is designed to receive, and to provide a means whereby a regular and gradual feed of material will be obtained, the quantity to be fed being under the complete control of the operator.

Another feature of the invention is to provide feeding rollers so connected that when one is adjusted it will maintain practically the same distance from the other, and to so shape spikes or teeth placed upon the rollers that the spikes will act to retard the movement of the grain to the cylinder to a predetermined extent, and to so shape and locate the spikes that sundry of them will at all times be in engagement with the grain, and whereby further when the spikes leave the grain they will leave it cleanly.

A further object of the invention is to provide a band-cutting and feeding attachment for thrashing machines which will be simple, durable and economic, and may be readily applied to any form of thrasher.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
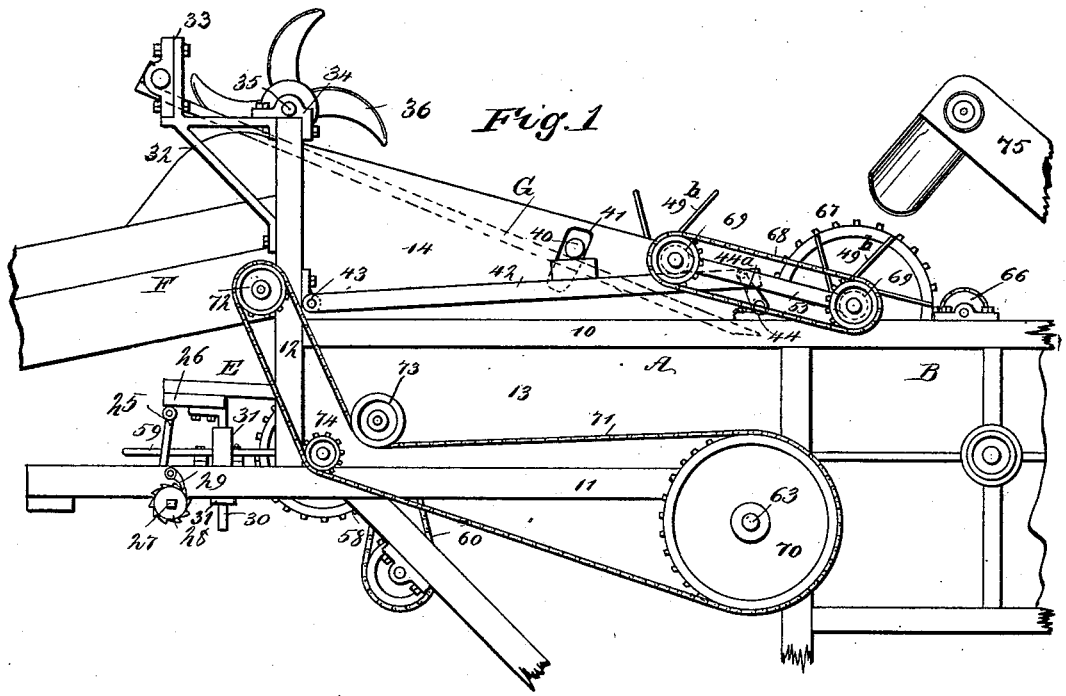
Figure 2:
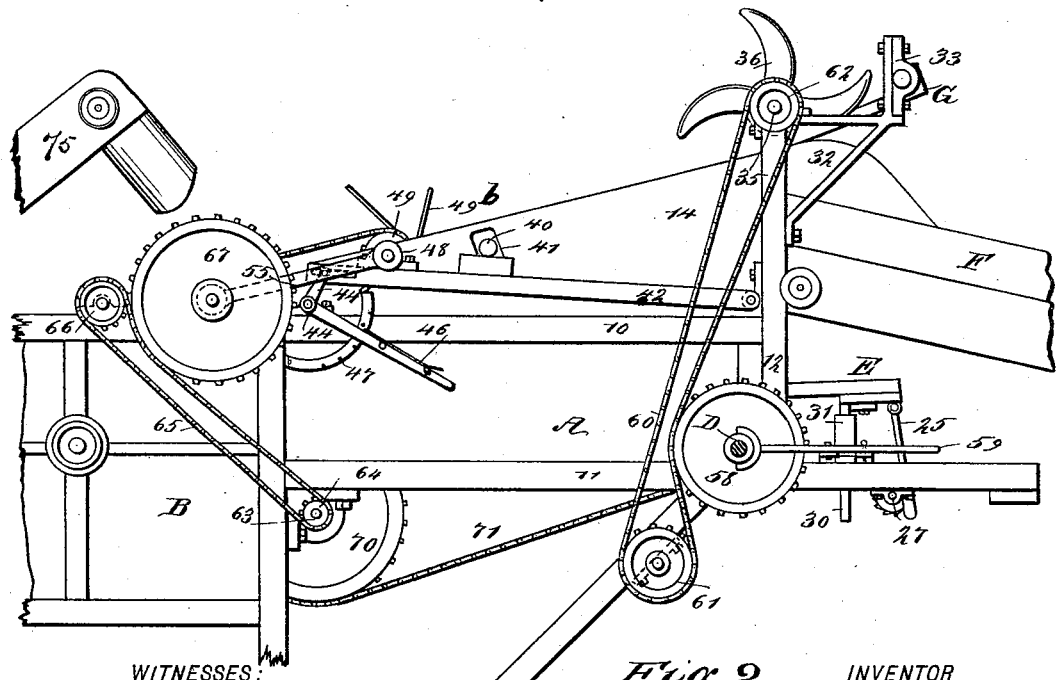

Figure 1 is a view of the attachment taken at the right-hand side of the machine. Fig. 2 is a side elevation taken from the right hand side of the machine. Fig. 3 is a central longitudinal vertical section taken practically on the line 3—3 of Fig. 4. Fig. 4 is a plan view of the attachment. Fig. 5 is a horizontal section taken above the feed tables and practically on the line 5—5 of Fig. 3. Fig. 6 is a front elevation of the feed tables, and their adjusting and driving mechanism. Fig. 7 is a view of the rear ends of the feed tables, the frame being in section, and said section of the frame is taken practically on the line 7—7 of Fig. 5; and Fig. 8 is a perspective detail view of a portion of an adjusting or lifting shaft adapted for use in connection with one of the feeding rollers.

The frame of the attachment comprises side extensions A, projected from the forward end of the thrashing machine B. These side extensions usually consist of an upper horizontal beam 10, which may be a continuation of the top beam or bar of the thrashing machine, a lower parallel beam 11, which extends in a forward direction much farther than the upper beam 10, and a standard 12, secured upon the lower beam 11, between its center and forward end, which standard is likewise attached to the forward end of the upper beam 10, and extends some distance above said beam. The formation of the side extensions A is completed by locating a panel 13 in the space between the upper and lower beams 10, and placing a second panel 14 upon the upper beam, which upper panel is likewise attached to the standard 12, and its upper edge is inclined downwardly and in a rearward direction, as shown in Figs. 1 and 2. Therefore, the upper panel may be said to be somewhat triangular in general contour.

Two feed tables C and C' are located within the space between the lower paneled portions of the sides A of the extension. The feed tables are of such width that two of them are about equal to the space between the sides of the extensions as shown in Fig. 6; and each table is preferably made of sheet metal, and the metal is corrugated transversely in such manner as to form an upper transverse stepped surface 15, as best shown in Fig. 3. The feed tables are inclined from their front end downwardly in direction of their rear, and a series of guide bars 16, is secured to the under surface of each feed table at its inner end, as shown both in Figs. 3 and 7, which guide bars rest upon a cross beam 17, located in front of the cylinder 18 of the thrasher. Thus it will be observed that the inner ends of the feed tables are immediately in front of the cylinder, and these tables are purposed to feed or to assist in feeding the grain to the cylinder. It may be remarked also that the inner ends of the feed tables are immediately above the machine concave 19. The forward ends of the feed tables are secured to a crank shaft D. This crank shaft is provided with two arms 20 and 21, and the arms are oppositely disposed, as is best shown in Fig. 6, the table C, for example, being secured to the crank arm 20, while the table C' is attached to the other crank arm 21. It will thus be seen that when the crank shaft is revolved the tables will alternately be one raised and the other lowered, and the table that is elevated will be given an inward or rearward throw, while the depressed table will be given a corresponding forward throw.

Each feed table is provided upon its upper surface with a series of pins 22. These pins are preferably graduated in length and are arranged in transverse rows extending at proper intervals apart from the forward end of the table to a predetermined point at or near its center; and the upper face of each table for the remaining portion of its length is provided with a series of saw-tooth partitions 23, which extend longitudinally of the tables, as best shown in Fig. 3.

In order that the pins 22 of the feed tables may be made to take more or less hold of the grain delivered to them, a regulating platform E, is located over the pin-carrying surface of both of the feed tables. The regulating platform is made up of a series of slats 24, as shown best in Figs. 4 and 5, and the said slats are so arranged that they extend longitudinally over the tables, and are so placed that the pins of the tables may extend upward between the slats. The platform is given an inclination, being highest at its forward end, and the inner end of the platform rests upon the tables or practically so, while the outer or forward end of the platform is connected by links 25, with a cross bar 26, connecting the slats of the platform; and the links 25, are secured upon a crank shaft 27, which shaft is preferably journaled in suitable bearings located upon the under surface of the lower beam 11 of the extension.

The crank shaft 27, is provided with a single crank arm, as shown in Fig. 6; and at one end said shaft is provided with a ratchet wheel 28, engaged by a pawl 29, the latter being spring-pressed if desired. Thus by turning the ratchet wheel by an attached handle or the shaft 27, which is usually squared at one end for the reception of a wrench or like tool, the forward or outer end of the regulating platform may be raised or lowered so as to permit the pins of the feed tables to extend to a greater or less degree above the platform, and in this manner the capacity of the feed tables is regulated. After the crank shaft 27, has been manipulated to adjust the regulating platform it is held in its adjusted position by the pawl 29 engaging with the ratchet 28.

The regulating platform is guided in its upward movement by securing to its head or cross bar 26 at each end a downwardly extending guide rod 30, and said rods are passed through guide brackets 31, located upon the base beam of the extension casing. The material to be conveyed to the cylinder of the thrasher is delivered upon the feed table, or more properly upon the regulating platform, to be engaged by the teeth of the feed table, through the medium of a conveyer F of any approved construction, the delivery end of the conveyer, as shown in Figs. 1 and 3, being located at a proper elevation over the forward end of the regulating platform. At this point it may be remarked that the regulating platform extends inwardly only to a point where the saw-tooth partitions commence. Therefore, after the grain leaves the regulating platform it is carried farther inward by the said partitions.

A bracket 32, is projected from the forward upper portion of each frame upright 12; and upon the forward extremities of the bracket boxes 33, are located, while other boxes 34, are secured upon the upper ends of the uprights, and in the latter boxes a shaft 35, is journaled. The shaft 35, is a knife shaft, and carries a number of knives 36, all the knives being somewhat S-shaped, as shown in Fig. 3, their convexed surfaces $36^a$ being their cutting surfaces. The shaft 35, passes through the central portion of the knives, which portion is preferably made somewhat of disk form to insure strength at that point; and the knives are located at predetermined distances apart, being supported by sleeves 37, or their equivalents, as shown in Fig. 4. The knives are so placed upon the shaft that when one is in a vertical position the next knife will be in a horizontal position, and through this arrangement when the knives are viewed from one end of the shaft they appear to be grouped in stellated arrangement. The knives revolve in the direction shown by the arrow in Fig. 3, and cut in direction of the cylinder. The grain or straw from the bundles severed by the knives is prevented from rising upward, or from following the upward course of the knives by means of a slatted divide board G, and the slats comprising the board are longitudinally arranged, and are adapted to extend longitudinally over the regulating platform E. The slats of the divide board at their forward or outer ends are connected by a cross bar 38, the said cross bar being provided with trunnions which are journaled in the boxes 33 located upon the brackets 32. The divide board extends in a downward direction beneath the knife shaft, and terminates over the inner or rear portions of the feed tables, as is best shown in Fig. 3, and as the knives revolve they pass downward between the slats of the divide board. The slats of the divide board are connected also by a second cross bar 39, located preferably at a point between its center and lower end. The ends 40 of the cross bar 39, pass through openings 41 made in the upper inclined panel 14 of the extension casing, and rest upon arms 42, located upon the outer faces of the said upper panel, which arms at their forward ends have hinged connection with the uprights 12, as shown at 43 in Fig. 1. The inner or rear ends of the arms 42, are connected with a shaft 44, the manner in which the connection is made being best shown in Fig. 8. The shaft 44, extends transversely across the top beams 10 of the extension casing, and the said shaft is provided at each end with a crank arm $44^a$, said crank arms having pins projected at an angle from them, entering slots 45, produced in the ends of the arms 42. The shaft 44, is manipulated in a manner to raise or lower its crank arms $44^a$, through the medium of a lever 46, which as shown in Fig. 2 is secured to one end of the shaft, and said lever is preferably provided with a thumb latch engaging a rack 47, so that the arms may be held in an upper or in a lower position as occasion may demand. The arms 42, near their rear ends, carry boxes 48, and in these boxes the trunnions of a forward regulator roller 49, are journaled; therefore, the regulator roller 49 will be raised and lowered with the arms 42 and the slatted divide board. The roller 49, comprises a body section $49^a$, and a series of spikes $49^b$, which spikes are secured to the peripheral surface of the roller and stand at an obtuse angle therefrom, the spikes being bent where they connect with the roller, as shown best in Fig. 3. The spikes are further spirally arranged upon the regulator roller, and extend practically from one end to the other in spiral rows; and as the roller revolves, the direction of its revolution being indicated in Fig. 3, it turns in the direction of the cylinder of the thrasher, and what may be termed the backs of the spikes will face the cylinder as the regulator roller revolves. A second roller 50, which may be called a feed roller, is located at the rear of the regulator roller 49, the second or feed roller being journaled in stationary bearings 51, which are preferably secured upon the upper edge of the thrashing machine just forward of the cylinder, so that the spikes will approach as closely to the teeth of the cylinder as practicable. The second feed roller revolves in like manner as the first, as is likewise shown by the arrow in Fig. 3, both of the feed rollers revolving in direction of the cylinder. The first spiked regulator roller 49, is raised or lowered to accommodate wet or dry grain. The feed tables are operated at a high rate of speed, while the spiked feed rollers have a very slow yet regular movement imparted to them in direction of the cylinder. Thus the pins upon the feed table will bear the straw through the spikes on the rollers as fast as the rollers will permit, and will carry a predetermined and equal quantity of straw to the cylinder. After the straw leaves the spiked regulator roller it is caught by the second or feed roller, and the object of this second roller is to prevent the cylinder feeding the grain to itself faster than delivered from the first roller, since the two rollers turn at the same speed. By means of the two rollers operating in conjunction a check is obtained upon the material fed to the cylinder, and it will be impossible for the cylinder to draw to itself any wet bunches which may be mixed up with the dry grain. It will also be observed that a steady and uniform feed is obtained, and therefore that wet or dry grain may be handled with equal facility. By reason of the peculiar angle at which the spikes stand to the body of the rollers the spikes will lift themselves cleanly out of the grain, while they will maintain a maximum purchase upon the grain while the two are in contact; and owing to the spiral arrangement of the spikes sundry of the spikes in each roller will at all times be buried in the grain. In order to insure the two spiked rollers remaining the same distance apart when the forward roller is adjusted upward or downward, the trunnions of the two rollers are connected by links 55, as shown best in Fig. 4.

The various parts of the attachment may be driven in many ways; one arrangement, however, is illustrated in the drawings, which is as follows: The crank shaft D, carrying the tables, may be properly said to be a drive shaft, and it may receive power from any driven shaft in the thrasher through the medium of a driving pulley 56, which is loosely mounted upon the said shaft at one end, for example at the right hand end; and the driving pulley is provided with a clutch face 57, adapted to engage with a clutch surface formed upon a driving gear 58, keyed or otherwise secured directly to the crank shaft, the clutch of the driving pulley being operated through the medium of a suitable shifting lever 59. A belt 60, may now be passed over an idler 61, located upon the frame, as shown in Fig. 2, upward to a frictional engagement with the driving pulley 58, and likewise to an engagement with a pulley 62, located upon the knife shaft 35. A driven shaft 63, may be located beneath the attachment adjacent to the thrasher, which shaft is provided with a pinion 64, and the said pinion 64, is connected by a belt 65 with an idler 66, located upon the thrasher, likewise shown in Fig. 2; and the said belt 65, is in frictional engagement with the large driving gear 67, secured to one trunnion of the rear spiked roller 50, the said roller 50 being connected by a belt 68 at its opposite end with the forward roller 49, the said connection taking place at the left-hand side of the machine, each of the rollers being provided at its sides with gears 69 of equal size. The driven shaft 63 carries at its left hand end a large gear 70, connected by a belt 71 with a pulley 72, located upon one of the drums of the conveyer, the said belt being usually made to engage likewise with idlers 73 and 74, as shown in Fig. 1. The elevator 75, shown in the drawings is the usual elevator employed to carry the unthrashed particles that may escape from the thrasher back to its cylinder.

It will be understood that the frame of the attachment may be differently constructed than illustrated, and that the rollers 49 and 50 and the knives may be placed closer together or farther apart than shown, and also that the cylinder of the thrasher may be placed differently with reference to the inner roller 50. The position of the shafts with reference to the parts to be driven and to each other, may likewise be changed, and the feed roller may feed to the cylinder below its center instead of above the center, without departing from the spirit of the invention.

Having thus described my invention, I claim as new and desire to secure by Letters Patent—

1. In a band cutter and feeder, the combination with a cutter and a feed-table arranged below it, of an adjustable regulator roller, slatted divide board adjustable with said regulator roller and a feed roller in rear of the regulator roller, substantially as described.

2. In a band cutter and feeder, the combination with a rotary cutter and a feed-table arranged below it, of a vertically adjustable regulator roller, a feed roller in rear of the regulator roller, a link connection between the said rollers, and a pivoted and slatted divide board adjustable with the regulator roller, substantially as described.

3. In a band cutter and feeding attachment for thrashing machines, the combination, with a crank shaft provided with crank arms, feed tables connected one with each crank arm, the said tables being provided with a stepped upper surface, and a series of pins projected from said surface for a portion of its length, the rear or inner portions of the tables having irregular partitions upon their upper faces, of a slatted regulating platform through which the pins of the tables extend, said platform being located over the tables, resting at one end thereon, and an adjusting mechanism connected with the opposite end of the platform whereby it may be raised or lowered to increase or to decrease the length of the pins above the platform, as and for the purpose specified.

4. In a band cutter and feeder for thrashing machines, the combination with a rotary knife, and regulator roller provided with spikes or pins, of a pivoted and slatted divide board below the knife and regulator roller, and means for adjusting said divide board, substantially as described.

5. In a band cutter and feeder for thrashing machines, the combination with a pivoted and slatted divide board, of pivoted arms upon which the free end of the divide board is supported, a regulator roller mounted in the free ends of the said arms and provided with projecting spikes or pins, and means for adjusting the free ends of the said arms, substantially as described.

6. In a band cutter and feeder for thrashing machines, the combination with a pivoted and slatted divide board provided with a transverse bar projecting beyond the sides of the frame, of pivoted arms upon which the ends of the transverse bar rest, a regulator roller mounted in the free ends of the said arms and having projecting spikes or pins, a shaft provided with crank arms engaging the free ends of the before mentioned pivoted arms, and means for operating said shaft, substantially as described.

7. In a band cutter and feeder for thrashing machines, the combination with feed tables formed with a stepped upper surface for a portion of their lengths and the remaining portion of their lengths with saw-tooth partitions and having pins on the stepped portion, of a slatted regulating platform projecting over the portions of the tables provided with the pins and beyond the ends of the said tables, and means for adjusting the projecting end of the platform vertically, substantially as described.

MOSES SCHLATTER.

Witnesses:
W. W. WITT,
LEWIS SMITH.